Hitchcock & Jones.
Gearing for Lamp-Train.
№ 74914.                    Patented Feb. 25, 1868.
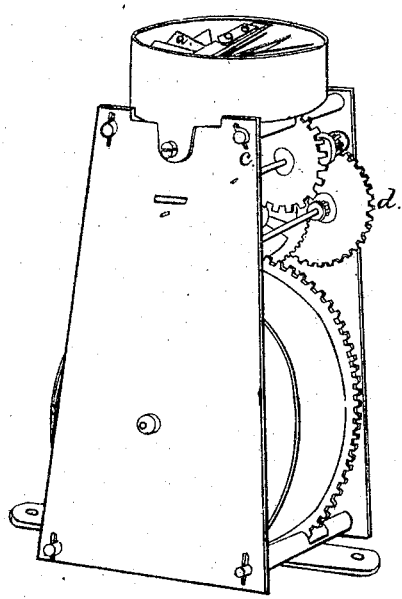
Fig. 2.                    Fig. 3.
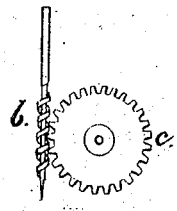     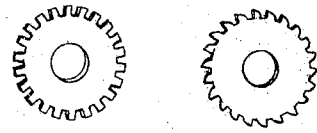
Witnesses.                                Inventors.

United States Patent Office.

ROBERT HITCHCOCK AND GEORGE A. JONES, OF NEW YORK, N. Y.

Letters Patent No. 74,914, dated February 25, 1868.

GEARING FOR LAMP-TRAINS.

The Schedule referred to in these Letters Patent and making part of the same.

TO ALL WHOM IT MAY CONCERN:

Be it known that we, ROBERT HITCHCOCK and GEORGE A. JONES, of the city, and county, and State of New York, have invented certain new and useful Improvements in Gearing for Lamp-Trains, and for other purposes; and we do hereby declare that the following is a full, clear, and exact description thereof, and of their action or operation, reference being had to the accompanying drawings, and to the letters of reference marked thereon, and making a part of this specification.

Our improvements are more particularly designed for use and application in combination with the mechanical movements used in such lamps as are the subject-matter of Letters Patent of the United States granted to F. B. DeCaravanan, February 10, 1863, and of other Letters Patent granted for improvements thereon to George A. Jones, November 10, 1863, in which lamps the mechanism is used to force to the wick an increased supply of atmospheric air, but said improvements can be combined with other mechanical movements, and applied to different purposes.

Our invention consists in the use and application, particularly in mechanism in which great speed of some of the parts is required, and the motion of such parts should be very uniform, of flexible or elastic gear-wheels, or wheels made of some substance or material which is less rigid or more elastic than ordinary metals, and which also has sufficient hardness to prevent wear or abrasion, such as hard rubber, or similar hard, horn-like substance, in the place of ordinary metallic wheels, or of wheels of soft material, such as wood, ivory, &c Figure 1 is a perspective view of a mechanical movement, such as is used in the lamps referred to, having two of its gear-wheels made of hard rubber.

Figure 2 is a detached view of the endless screw, giving motion to the air-fan in such train, in combination with a hard-rubber toothed wheel operating such screw.

Figure 3 illustrates hard-rubber wheel with differently-shaped teeth.

In the mechanism used for supplying air to the lamp before referred to, it is specially desirable to have as small and compact a train as possible, requiring but comparatively small power, and by it to secure the greatest speed possible to the air-fan $a$, so as to furnish the largest amount of air to the wick, and it is also particularly desirable that such fan should move with great steadiness and regularity, so as to secure a uniform supply of air to the wick, and thereby produce uniformity of combustion and illumination. The mechanism must also move with but little if any noise, so as to avoid objection on account of disturbance therefrom. When the several wheels of the train are of metal, they strike rigidly against each other, necessarily causing more or less noise from their continuous rapid impact with each other, and the required rapid revolution of the fan $a$ causes constant and increasing wear of the cogs upon the wheels, particularly between the fan-screw $b$ and the wheel $c$ gearing into it, thereby increasing friction and requiring frequent lubrication. The motion of the fan is also rendered less uniform, thereby affecting the steadiness of the combustion and illumination. If, on the other hand, the wheels are made of softer material, as wood or the like, the friction will be increased, and sufficient motion cannot be imparted to the air-fan to secure the necessary quantity of air to effect complete combustion. But by making the wheels $c$ and $c'$, which have the greatest number of revolutions, and particularly the wheel $d$, which gears into and imparts motion to the fan $a$, of hard rubber, it is found that with the same power, the number of the revolutions of the fan $a$ are greatly increased, and its motion is much more uniform, and the combustion rendered more equable, and the illumination correspondingly improved. By the use, also, of such wheel, made of such material, the power is received and transmitted more gently and with far less noise, and there is scarcely any wear or abrasion between the metal and the hard rubber, thereby reducing friction, and rendering lubrication but very seldom necessary. By the increased motion of the fan, a greater amount of oxygen is supplied, without any increase of power to the wick, and a more steady and increased light secured.

In a mechanical train like that shown in fig. 1, actual experiment has shown the following results, as to the number of revolutions of the fan $a$ in a given time and with the same motive-power, when only the wheel $c$ has been made of different substances: With a wood-wheel, it had eight hundred turns a minute; with a wheel of raw hide, eight hundred and seventy-five turns; with a wheel of tortoise-shell, nine hundred and fifty turns; with a wheel of ivory, one thousand turns; with a wheel of metal, one thousand turns; with a wheel of whalebone, one thousand and fifty turns; with a wheel of hard gutta percha, twelve hundred turns; and with a wheel of hard rubber, fifteen hundred turns.

Such experiments prove conclusively that by the use of gearing made of hard rubber, even when only in combination with the endless screw that gives motion to the air-fan, there is obtained a greater velocity of the fan than can be secured by the use of like gearing, when made of any ordinary substance. Such material, while it possesses all required hardness, so as to withstand wear or abrasion, possesses also, in connection therewith, sufficient elasticity to receive and transmit the power more easily or less rigidly, and at the same time with scarcely any perceptible noise.

It will be readily apparent that gearing made of the same material can be applied to many other purposes than that before described, and in different kinds of mechanism, particularly where rapidity of movement is desired, and the power required is not great, and compactness of structure is necessary. Its application may also be more extensive than the few wheels having the quickest movement in any piece of mechanism.

What is claimed as new, and is desired to be protected by Letters Patent, is—

1. A gear-wheel constructed of hard rubber, or similar material, possessing sufficient hardness, with elasticity for gearing, for the purposes set forth.

2. The combination of gear-wheels made of hard rubber or other material, uniting like hardness and elasticity, with metallic gearing in mechanical movements, for the purposes set forth.

3. The combination, in mechanical trains for supplying air to lamps, of the hard-rubber gear $c$ with the fan-wheel screw-shaft, substantially as and for the purposes set forth.

ROBERT HITCHCOCK,
GEO. A. JONES.

Witnesses:
S. D. LAW,
FRED. B. SEARS.